United States Patent [19]

Hawk et al.

[11] Patent Number: 5,765,506

[45] Date of Patent: Jun. 16, 1998

[54] ANIMAL WATERING SYSTEM WITH DRINKERS HAVING REMOTELY OPERABLE HEIGHT ADJUSTMENT

[75] Inventors: John M. Hawk, Old Fort, Tenn.; Robert J. Cron, Fort Recovery, Ohio

[73] Assignee: Lubing Systems Corporation, Woodstock, Ga.

[21] Appl. No.: 785,290

[22] Filed: Jan. 21, 1997

[51] Int. Cl.$^6$ .................................................. A01K 7/00
[52] U.S. Cl. ........................................................ 119/456
[58] Field of Search ................................. 119/456, 464, 119/475, 515, 72, 74

[56] References Cited

U.S. PATENT DOCUMENTS

| | | | |
|---|---|---|---|
| 4,164,201 | 8/1979 | Vanderhye | 119/81 |
| 4,173,948 | 11/1979 | Austin | 119/72 |
| 4,348,989 | 9/1982 | Vik | 119/72 |
| 4,656,970 | 4/1987 | Hostetler | 119/75 |
| 4,724,797 | 2/1988 | Steudler, Jr. | 119/72 |
| 4,884,528 | 12/1989 | Steudler, Jr. | 119/72 |
| 5,048,462 | 9/1991 | Hostetler | 119/72 |
| 5,189,983 | 3/1993 | Aitchison | 119/456 X |
| 5,339,768 | 8/1994 | Schumacher | 119/72 |

OTHER PUBLICATIONS

Author Unknown, "American Drinker Gives Benefits," International Poultry Production, p. 51, Date Unknown.

*Primary Examiner*—Thomas Price
*Attorney, Agent, or Firm*—Deveau, Colton & Marquis

[57] ABSTRACT

An animal watering system and method which includes a number of drinkers which can be remotely adjusted, upwardly and downwardly, to correspond with the height of the animals to be watered, as the animals grow, the drinkers having a carriage which slides within a support frame anchored to the animals' cage. The method and system of the invention allows force to be applied to the carriage in both the upward direction and the downward direction for remote height adjustment, and a coupling system permits the simultaneous remote height adjustment of some or all of the drinkers in the animal watering system.

46 Claims, 4 Drawing Sheets

ANIMAL WATERING SYSTEM WITH DRINKERS HAVING REMOTELY OPERABLE HEIGHT ADJUSTMENT

BACKGROUND OF THE INVENTION

1. Field of the Invention

The present invention relates generally to a watering system for animals, and more specifically relates to a poultry watering system having a number of vertical arrays of coupled drinkers all of which can be remotely and simultaneously adjusted upwards and downwards, at continuous increments, to correspond with the height of the poultry as the poultry grows, and be easily reset at a lower height for a new flock of poultry chicks.

2. Description of Related Art

The poultry growing industry has become increasingly automated in modern years, as heightened competition in the industry has necessitated greater efficiencies with reduced labor costs. One aspect of the poultry growing industry to which significant efforts have been directed is the automation of the feeding and watering of the birds.

It is necessary that the poultry be provided with sufficient water in a readily accessible manner, and with minimal maintenance and operation costs. It is also desirable to minimize spillage and overflow of the water, as standing water on the floors of poultry raising facilities can promote the growth of microorganisms which may cause disease and increased mortality in the flock. In addition, it has been found desirable to control the height at which water may be accessed by the birds. If water is supplied at a level which forces the bird to reach down to drink, the bird will often drop food onto the floor and may not obtain sufficient water for proper growth. However, if water is supplied at a raised elevation, thereby forcing the bird to reach up to drink, the bird will swallow its food, thereby improving feed conversion and reducing waste. Obviously, if the water supply is too high, the bird will not be able to obtain water, and will not properly develop.

Poultry pullets are commonly raised in cages between the ages of one (1) day old to eighteen (18) weeks. In order to provide water at an accessible elevation to growing chicks or pullets, it is necessary to adjust the height of the drinkers from which water is supplied as the birds grow. Once the pullets have reached maturity, they are typically transferred to other facilities, such as for housing egg-laying birds or roasters. A new flock of pullets is then introduced to the pullet cages, and the drinkers must be lowered to the drinking height of starting pullets. When utilizing known poultry watering devices, the lowering of the drinkers must be accomplished by manually pushing each individual drinker downward into the lower position. This operation is highly labor intensive and, thus, involves substantial expense. To this end, a variety of adjustable height watering devices have been developed.

For example, U.S. Pat. No. 4,164,201 to Vanderhye discloses a ground-supported drinking trough which can be adjusted to vary the height of the drinking reservoir depending upon the size of the poultry which will be drinking from the device. Ground supported watering devices such as shown by Vanderhye, however, have been found disadvantageous in several regards. First, because these devices, by their nature, rest on the floor of the poultry raising facility, they occupy a substantial amount of floor space, reducing the number of birds which can be housed in the facility. An additional drawback to this type of watering device is that the open water reservoir can collect dropped food and other debris, including feces, and may promote the growth of bacteria and other disease causing organisms. Also, because the birds must reach down to drink from the open trough of this type of watering device, birds may drop feed when drinking, thereby reducing feed conversion. Furthermore, height adjustment of this type of watering device is highly labor intensive as each drinker must be raised and lowered independently. Maintenance and operation costs are also significant, due to the necessity of periodic cleaning of the open water reservoir.

Another variety of open reservoir watering device is shown by U.S. Pat. No. 4,656,970 to Hostetler. Although this device can be supported above the ground, it retains the remaining disadvantages of open reservoir watering described above. Height adjustment in the upward direction can be effected by applying an upward force to a cord connected to the drinker unit. However, this device and others of its general type make no provision for height adjustment in a downward direction. Friction or misalignment between the tongue elements of the tracks, upon which the grooves of this device's support panel slide, typically prevent the free movement of the drinker. Thus, if the drinker is raised too high during adjustment, or if the drinker must be lowered when new pullets are introduced, the drinker must be manually lowered. Hostetler also makes no provision for raising more than one drinker at a time. Thus, if the height of a number of drinkers must be adjusted, the process becomes time consuming and expensive.

Other types of adjustable height watering systems are known, such as, for example, U.S. Pat. Nos. 4,724,797 and 4,884,528 to Steudler, Jr. These watering systems include a watering pipe carrying a plurality of drinker nipples. The watering pipe is suspended from cords, and height adjustment is achieved by releasing a clamp, manually raising or lowering the clamping position of each suspension cord, and re-engaging the clamp at the new height. Although this variety of watering system eliminates the above-described disadvantages inhering in open reservoir watering, height adjustment remains labor intensive due to the necessity of individually adjusting the clamping position of each suspension cord. Also, because the drinker nipples are directly mounted to the watering pipe, this type of watering system is particularly unsuited for use with birds being raised in stacked rows of individual cages.

Another variety of known watering device is depicted in FIG. 1. This watering device 10 is adapted for use in a cage 12. Typically, the cage 12 will include sidewalls constructed of horizontal wires 14 and vertical wires 16. A segment of one or more of the horizontal wires 14 is cut out, and a pair of rails 18, 20 placed over adjacent vertical wires 16. A waterer 22 is placed between the rails 18, 20. Channels 24, 26 in the waterer 22 slideably engage the rails 18, 20, to permit vertical adjustment of the watering height. Water is supplied to the waterer 22 via a hose or tubing 28. The birds can drink from the nipple 30 of the waterer 22 by striking the trigger pin 32. Watering devices of this variety can be manually adjusted to the desired drinking height by sliding the waterer 22 along the rails 18, 20. Typically, there is sufficient friction between the rails 18, 20 and the channels 24, 26 to retain the waterer 22 in position at the selected height. A flexible cord (unshown) can be attached to the waterer 22 in a manner similar to that described by U.S. Pat. No. 4,656,970 to enable upward height adjustment of the waterer 22. Such an arrangement does not, however, enable the downward adjustment of the waterer 22. Thus, labor intensive manual adjustment remains necessary if the waterer must be lowered. The use of springs or weights to urge the waterers downwardly has not been found to provide acceptable performance in practice. This is primarily because even if the rails 18, 20 and the channels 24, 26 are dimensioned to permit free-sliding of the waterer, the loose fit of the rails 18, 20 on the vertical wires 16 of the cage will often create misalignments which inhibit the free motion of the waterer 22 along the rails 18, 20.

Thus, it can be seen that a need exists for an animal watering system which can be utilized with stacked rows of cages for containing the animals, and which occupies little or no floor space in the cages.

In addition, a need exists for an animal watering system having a number of individual drinkers, which watering system enables the remote height adjustment of the plurality of drinkers.

A need also exists for such an animal watering system whereby a number of individual drinkers can be coupled to allow simultaneous remote adjustment of the watering height of some or all of the waterers in a poultry raising facility.

A need further exists for an animal watering system having a plurality of drinkers, which drinkers can be remotely adjusted in both an upwards and a downwards direction, and for a method of watering poultry or other animals at a selected height which can be adjusted in an upwards direction and in a downwards direction.

A further need exists for an animal watering system having a plurality of drinkers with adjustable height carriages, which carriages engage a frame which minimizes or eliminates misalignment along the sliding interface between the frame and the carriage.

It is to the provision of an animal watering system and method meeting the above needs that the present invention is primarily directed.

BRIEF SUMMARY OF THE INVENTION

Briefly described, in preferred form, the present invention comprises an animal watering system suitable for use in raising poultry pullets or other animals in cages or other containers. The watering system preferably includes a plurality of drinkers, at least one drinker supplying water to each cage or container which is a part of one or more stacked rows of cages or containers.

Each of the drinkers preferably comprises a carriage slideably mounted within a support frame, thereby enabling selective adjustment of the drinking height. The carriage of each drinker preferably is uniquely configured to carry one or more nipple and triggering pin assemblies from which the animals can obtain water. Such nipple drinkers are known in the art. A length of flexible tubing or hose carries water from a supply header or other source to the drinkers.

Coupling means preferably are provided between the drinkers and a remote actuator, such as a manual or an electric winch, for remote and simultaneous adjustment of some or all of the drinkers in the watering system. Means are provided for applying force to the carriage of the drinkers in both an upwards direction and a downwards direction, thereby enabling continuous and infinite upward and downward height adjustment within the boundaries of the frame. Means are preferably also provided for coupling driven drinkers, which are moved upwardly and downwardly by the actuator means, to one or more follower drinkers, thereby enabling the coupled height adjustment of one or more arrays of drinkers within the watering system.

The frame in which the carriage of each drinker is engaged preferably is constructed as a single rigid element which engages a portion of the cage or container in which the animals are housed. In this manner, misalignment and binding along the interface between the carriage and frame of the drinkers is minimized or eliminated.

Thus, it is an object of the present invention to provide an animal watering system for use in cages or containers for housing poultry or other animals, which watering system includes a plurality of drinkers, at least one drinker supplying water to each cage or container.

Another object of the present invention is the provision of drinkers which can be remotely adjusted in both an upwards and a downwards direction.

Still another object of the present invention is the provision of a method for watering animals whereby the watering height may be remotely adjusted in an upwards direction and in a downwards direction.

It is a further object of the present invention to provide an animal watering system having a plurality of drinkers, which animal watering system further comprises coupling means between the drinkers and a remote actuation device, thereby enabling the remote simultaneous adjustment, upwards or downwards, of the height of some or all of the drinkers in the animal watering system. In this manner, the watering system of the present invention permits the automated lowering of some or all of the drinkers when new pullets are introduced, and when the drinkers are inadvertently raised too high during adjustment.

Still another object of the present invention is the provision of a unitary, rigid frame for attachment to an animal cage or container, which frame reduces or eliminates misalignment and jamming of the drinkers during height adjustment.

These and other objects, features, and advantages of the present invention will become more apparent upon reading the following specification in conjunction with the accompanying drawing figures.

BRIEF DESCRIPTION OF THE DRAWING FIGURES

DETAILED DESCRIPTION OF A PREFERRED EMBODIMENT

Figure 1:
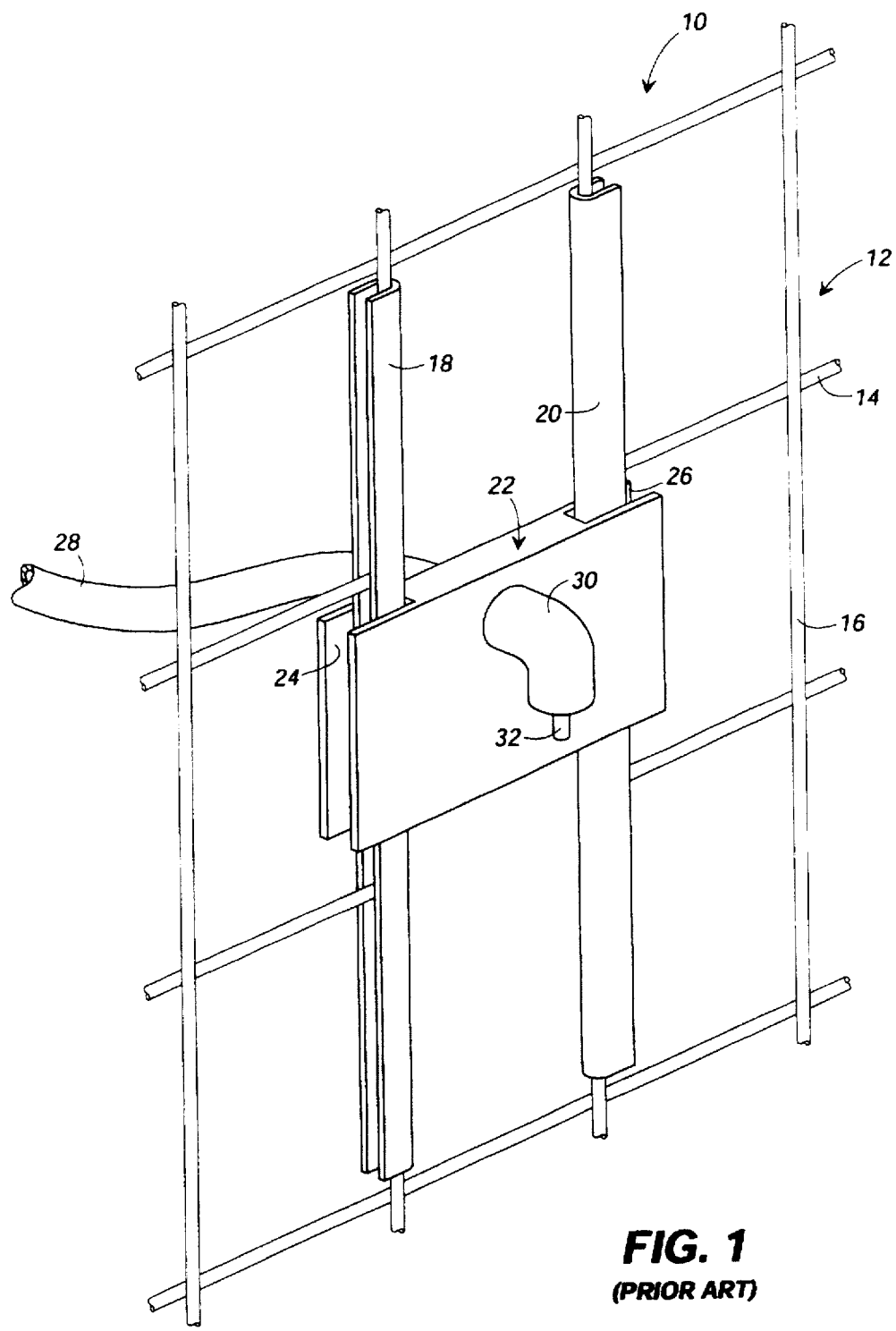
FIG. 1 is a perspective view of a known watering device.
Figure 2:
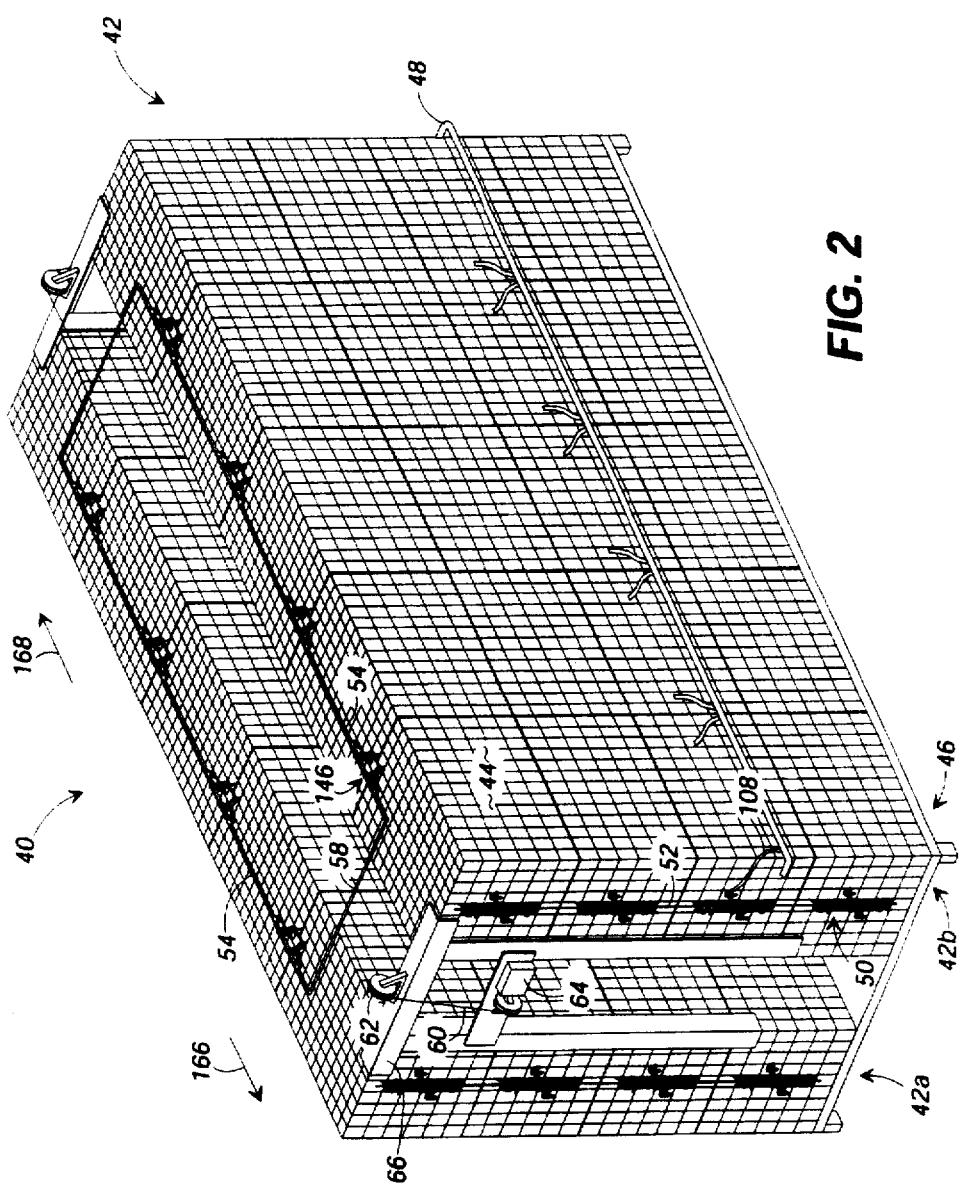
FIG. 2 is a perspective view of a preferred embodiment of the animal watering system of the present invention, installed in a row of cages.

Referring now in detail to the drawing figures, wherein like reference numerals represent like parts throughout the several views, FIG. 2 shows an animal watering system according to a preferred form of the present invention as mounted on a row of cages. The animal watering system 40 of the present invention is particularly well-suited for use in raising poultry pullets or other small animals during their early growth stages. Starting poultry chicks will generally have a preferred drinking height of approximately four inches (4"). As the birds grow, they generally attain a preferred drinking height of approximately six to eight inches (6"–8") by ten (10) days of age. At approximately eighteen (18) weeks, the birds generally have reached their maturity size.

One preferred manner of use of the animal watering system 40 of the present invention is in connection with rows 42 of enclosures, such as cages 44 or other containers, for housing the poultry pullets. Commonly, two (2) vertical stacks 42a, 42b, four cages high, are designated as a row. One (1) or more rows 42 of cages 44 are typically housed within a weatherproof enclosure, namely a chicken coop or other enclosure. The rows 42 of cages 44 preferably are supported above the ground by a support frame 46. FIG. 2 shows rows 42 of only five (5) cages in length. It will be understood that in standard commercial poultry raising operations, these rows may be as long as four hundred feet (400') or longer. Thus, each row 42 comprises a large number of cages 44, each cage housing a number of pullets which must be supplied with water throughout their growth cycle.

Water from a water supply header 48 is supplied to the growing poultry pullets by the animal watering system 40 of the present invention through the use of drinkers 50. For purposes of clarity, FIG. 2 shows only one water supply header 48. It will be understood that one or more additional water supply headers will typically be provided to supply water to each layer of cages 44 in the row 42. At least one drinker 50 must supply water to each cage 44 in which animals are housed. As shown best by FIG. 2, two or more drinkers 50 can be coupled by a connecting rod 52 to form a vertical array of drinkers 50, and thereby enable simultaneous height adjustment of the watering elements of drinkers 50 as will be more fully described below. Although only those drinkers 50 on the end of row 42 are visible in FIG. 2, it will be understood that additional drinkers are typically present within the interior of the row 42 to provide water to all of the cages 44 within the row 42. Commonly, drinkers 50 are installed on each endwall of all cages 44 within a row 42.

Each row 42 of cages 44 preferably is provided with an actuation system for raising and lowering the watering elements of the animal watering system 40 as necessary to accommodate the growth of the pullets or other animals. As shown in FIG. 2, the actuation system preferably comprises, in part, an elongate actuating member, such as actuating rod 54, generally oriented above each vertical stack 42a, 42b of cages 44. Actuating rod 54 is preferably a rigid element capable of transmitting forces in tension and in compression. However, a flexible actuating member, such as a cable, can be utilized if the actuating system is arranged in a manner which maintains the actuating member in tension. A yoke 58 can be provided to connect the ends of two (2) or more actuating rods 54, and thereby couple their motion. A remote actuating device such as a manual or an electric winch 64 preferably is coupled to the yoke 58 by means of a cable 60. Alternatively, a liner actuator such as a pneumatic or hydraulic cylinder can be utilized as the actuating device. The winch 64 can be mounted to an end brace 66 in a conveniently accessible location, through the use of one (1) or more pulleys 62. It will be understood that, through the use of a system of pulleys, a single winch or other actuating device can be utilized to drive the actuating rod 54 by pulling the actuating rod in either direction. Alternatively, two actuating devices can be provided, one to pull the actuating rod 54 in each direction. If a rigid actuating rod 54 is utilized, a single linear actuator such as a pneumatic or hydraulic cylinder can be utilized to drive the actuating rod 54 in both directions.

Figure 3:
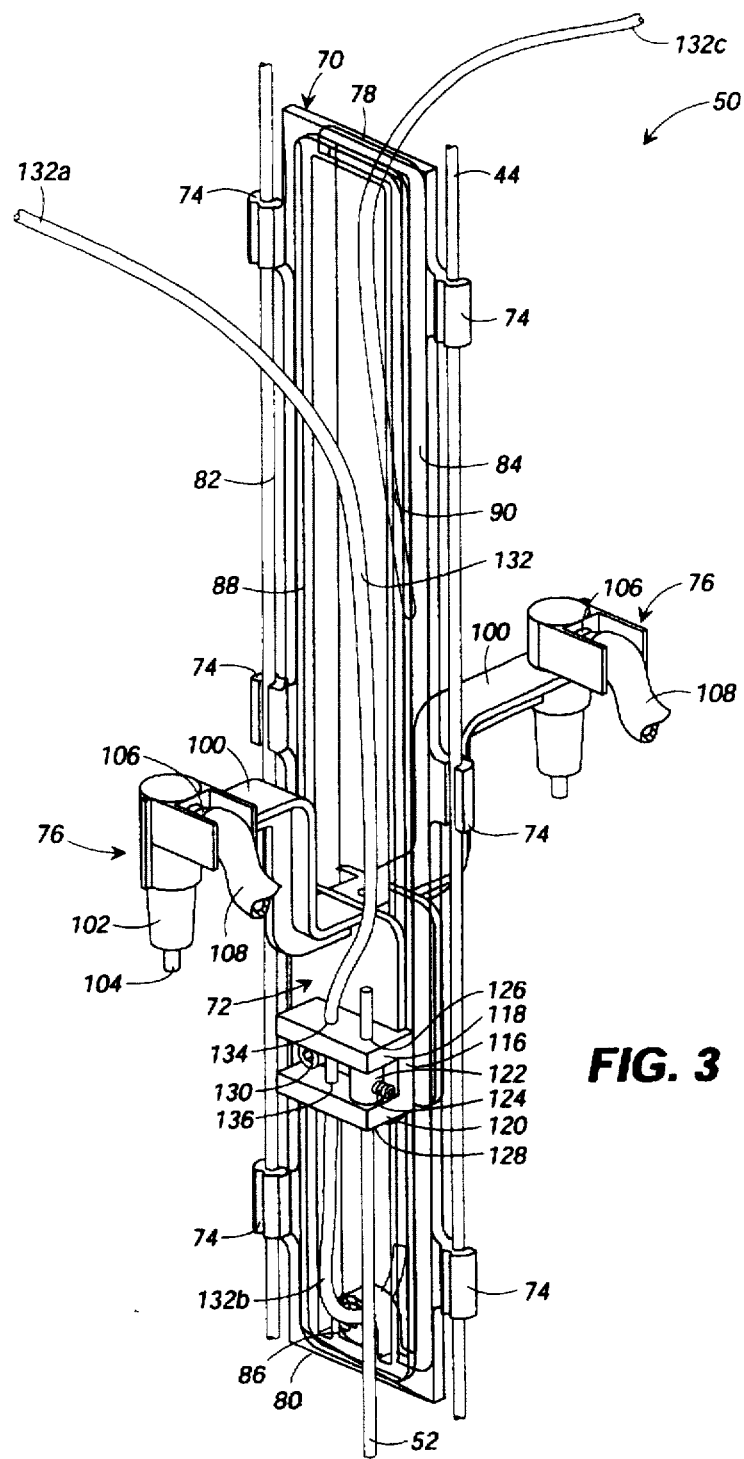
FIG. 3 is a perspective view of a drinker according to one preferred embodiment of the present invention, showing both the carriage and the frame.

As shown by FIG. 3, each drinker 50 of the animal watering system 40 of the present invention generally comprises a mounting means, such as a frame 70, and a movable carriage 72. The frame 70 supports the drinker 50 on the cage 44 or other structure housing the animals. Sections of one or more horizontal wires in the cage can be cut out, as necessary, to accommodate the frame 70. Clips 74, or other attachment means, can be provided to secure the frame 70 to the cage 44 or other structure. The carriage 72 of each drinker 50 preferably comprises at least one watering element 76.

In preferred form, the mounting means for attaching the drinkers 50 to the cages 44 comprises a frame 70 having a top 78, a bottom 80, a first side 82, and a second side 84. Top 78 extends between the upper ends of the sides 82, 84, and bottom 80 extends between the lower ends of the sides 82, 84. The frame 70 preferably also includes a guide element 86 at one end thereof. As shown in FIG. 3, the guide element 86 is adjacent the bottom 80 of the frame 70. It will be understood, however, that a reversed embodiment, wherein the guide element 86 is adjacent the top 78, is also possible if the actuation system operates from below. Preferably, the first side 82 of the frame 70 is provided with a first track portion 88, and the second side 84 of the frame 70 is provided with a second track portion 90, each track portion 88, 90 having a generally smooth uniform surface along which the carriage 72 can slide. The track portions 88, 90 are preferably disposed on the interior edges of first and second sides 82, 84, respectively. To this end, track portions 88, 90 are of a thickness which allows them to slideably engage carriage 72 as discussed in more detail below.

In preferred form, the first side 82 and the second side 84 of the frame 70 are each provided, on their exterior edges, with three clips 74 for securing the frame 70 to the cage 44 in a stable manner. Preferably, each side of the frame 70 is provided with one clip 74 adjacent the top 78, one clip 74 adjacent the bottom 80, and one clip 74 approximately midway along the side between the top 78 and the bottom 80. As shown in FIG. 3, it is preferred that the middle clip 74 on each side of the frame 70 be oriented to face in a direction opposite the clips 74 adjacent the top 78 and the bottom 80. In this manner, the clips 74 on each side 82, 84 can grip one of the vertical wires of the cage 44 from both sides, thus providing a more secure attachment. It will be understood that the overall width of the frame 70 can vary so that the spacing between the clips 74 on the first side 82 and the clips 74 on the second side 84 match the spacing between adjacent vertical wires of various commercially available cages 44. By securing the frame 70 to the cage 44 in the manner described above, the frame 70 is securely attached to the cage 44, thereby lending additional rigidity to the frame 70 to maintain the track portions 88, 90 in uniform spacing and alignment, and minimizing or eliminating any binding between the slots 98, 99 of the carriage and the tracks 88, 90 of the frame as the carriage is moved up and down along the frame.

Figure 4:
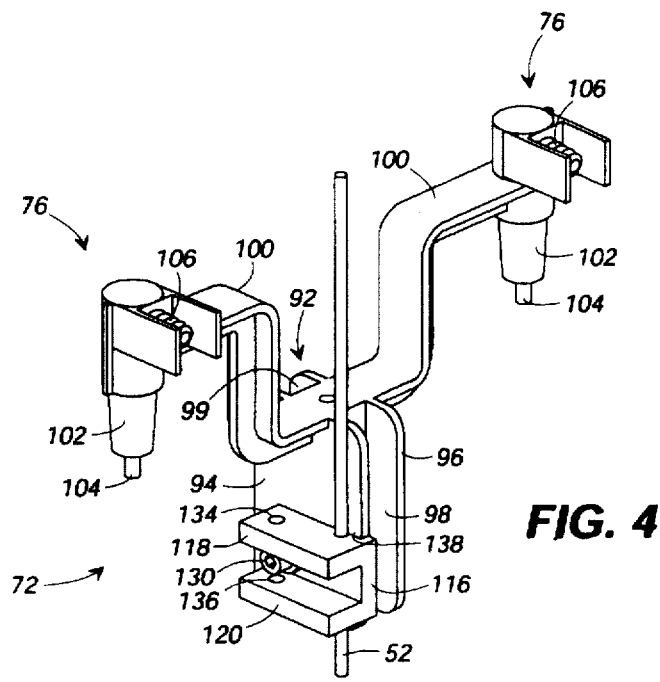
FIG. 4 is a perspective view of the carriage portion of the drinker of the present invention, according to an alternate embodiment.

As seen best in FIGS. 3 and 4, the carriage 72 preferably comprises a body 92, including a first flange 94 and a second flange 96 defining therebetween slots 98, 99. The slots 98, 99 are of sufficient depth to retain the carriage 72 within the frame 70, and have a width approximately equal to or slightly greater than the thickness of the first and second tracks 88, 90, thereby allowing smooth sliding of the carriage 72 along the frame 70. It will be understood that two slots 98, 99 can be provided along opposite sides of the body 92 to engage the first and second tracks or, alternatively, a single slot surrounding the entire circumference of the body 92 can be provided. The carriage 72 preferably is slideably mounted within the frame 70 to enable adjustment of the height of the watering elements 76 upwards and/or downwards, to accommodate the growth of the pullets or other animals, and to reset the watering elements 76 at a lower position for a new flock of chicks. Although the depicted embodiment shows track portions 88, 90 on the sides 82, 84 of the frame 70, and slots 98, 99 on the carriage 72, the reversed configuration, wherein slots are provided on the sides 82, 84 of the frame 70 for slideably engaging one or more tabs provided on the carriage 72, is also possible, and within the scope of the present invention.

The frame 70 and the carriage 72 preferably are fabricated, as by injection molding, from plastics such as PVC or ABS. The frame 70 preferably is fabricated as a unitary element having sufficient flexural rigidity to resist misalignment of first track 88 and second track 90, in order to minimize or eliminate binding between the slots 98, 99 of the carriage 72 and the tracks 88, 90 throughout the range of motion of the carriage 72 within the frame 70. The first and second sides 82, 84 of the frame 70 preferably are of a material having sufficient resilience to permit insertion and removal of the carriage 72 during assembly, and for maintenance purposes, and to allow attachment of the frame 70 to cage partitions which may be slightly curved or otherwide deformed by use. Similarly, the clips 74 preferably have sufficient resilience to snap over the wires of the cage 44 during mounting and demounting of the frame 70.

In its preferred form, the carriage 72 includes one (1) or more watering elements 76. As shown in FIGS. 3 and 4, the carriage 72 can include two (2) watering elements 76, thereby enabling the supply of water to pullets housed in two (2) adjacent cages 44 in a row 42. Alternatively, the carriage 72 can be provided with only a single watering element 76, for use with the drinkers 50 at the ends of the row 42 of cages 44. Each watering element 76 is connected to the body 92 of the carriage 72 by an arm 100. As shown best by FIGS. 3 and 4, the arm 100 is, in preferred form, generally T-shaped in cross-section, for increased structural strength. A nipple 102 having a triggering pin 104 is mounted at the end of the arm 100 distal the body 92. Water is supplied to the nipple 102 via a connection nozzle 106 from a length of flexible tubing 108 which is connected to the water supply header 48 or other external water source. The nipple 102 and triggering pin 104 assembly is of standard known construction, and will release water when the triggering pin 104 is struck by the animal.

In preferred form, the arm 100 is curved or angled to support the nipple 102 at a height of approximately between two to six inches (2"-6"), most preferably approximately four inches (4") above the floor of cage 44 when the body 92 of the carriage 72 is in its lowermost position. This elevation approximately corresponds to the watering height of a starting poultry pullet. When the carriage 72 is in its uppermost position within the frame 70, the nipple 102 preferably is supported at a distance of approximately twelve to sixteen inches (12"-16") most preferably approximately fourteen inches (14") above the floor of the cage 44, corresponding approximately to the drinking height of a mature bird. The upward curvature or angle of the arm 100 also allows the nipple to be raised substantially all the way to the top of the cage for improved drinking efficiency when used with larger birds; the curvature or angle of the arm 100 allowing clearance of the top 78 of the frame 70.

As shown best by FIGS. 2 and 3, the carriages 72 of two or more vertically arrayed drinkers 50 can be coupled by means of a connecting rod 52. The connecting rod 52 is preferably of sufficient rigidity to transmit force in both tension and compression and resist buckling as the carriages are raised and lowered. By coupling the carriages of each drinker 50 in a vertical array with a connecting rod 52, the drinking height (i.e., the height of the nipple 102 above the floor of cage 44) of all coupled drinkers 50 in the vertical array can be simultaneously adjusted upwards and downwards by moving any one of the coupled carriages. As discussed in more detail below, preferably there is one driven carriage 72 per vertical array. The remainder of the carriages 72 in each vertical array are follower carriages 72 coupled to the driven carriage by connecting rod 52. As will be seen, when the driven carriage is adjusted, the follower carriages consequently are adjusted.

The connecting rod 52 preferably is attached to each carriage 72 by means of a clamping bracket 116 as shown in FIG. 3. The clamping bracket 116 preferably comprises an upper shoulder 118 and a lower shoulder 120. An upper connecting rod opening 126 and a lower connecting rod opening 128 allow the connecting rod 52 to pass through the upper shoulder 118 and lower shoulder 120, respectively, with a sliding or running fit, thereby enabling the connecting rod 52 to turn within the upper and lower shoulders 118, 120, and thereby resist binding due to minor misalignments. The fit between the connecting rod 52 and the upper and lower connecting rod openings 126, 128 is preferably sufficiently loose to permit smooth operation, even if the cage partitions upon which the frame 70 is mounted are curved or otherwise deformed, and/or if the frames 70 in a vertical array are slightly misaligned from one another. A locking collar 122 is affixed on the connecting rod 52 by means of a set screw 124 to prevent translational movement between the connecting rod 52 and the clamping bracket 116 while allowing free rotational movement, and some side-to-side or rocking movement therebetween. The set screws 124 of any one or more of the drinkers 50 found to be out of alignment with the other drinkers in its vertical array can be independently loosened to permit easy adjustment of the positioning of the carriage(s) 72 of that particular drinker or drinkers, without requiring adjustment of other carriages 72 coupled in a vertical array on the connecting rod 52. As described below, the clamping bracket 116 is preferably attached to the body 92 of the carriage 72 by means of a clamping screw 130. Alternatively, the clamping bracket 116 can be fabricated as an integral part of the carriage 72, or can be attached by alternate attachment means such as adhesives, rivets, screws or nails.

An alternate embodiment of the clamping bracket 116 is depicted in FIG. 4. In this embodiment, the clamping bracket 116 also preferably comprises an upper shoulder 118 and a lower shoulder 120. In this embodiment, however, the connecting rod 52 is constrained within a connecting rod channel 138 along the interface between the clamping bracket 116 and the body 92 of the carriage 72. In this embodiment, the clamping bracket 116 functions in similar manner to that described above, but resists relative movement between the carriage 72 and the connecting rod 52 in both the rotational and translational directions.

In preferred form, the animal watering system of the present invention also comprises height adjustment means for driving at least one carriage in each coupled vertical array of drinkers (the driven carriage) in both the upwards and the downwards directions. As seen best in FIGS. 3 and 5, the height adjustment means preferably comprises a flexible link 132, such as a monofiliment line or cord, for applying upwards or downwards forces to the driven carriage 72 for height adjustment. As depicted, the monofiliment line 132 has a first end 132a, a second end 132c, and an intermediate portion 132b therebetween. The intermediate portion 132b is affixed to the carriage 72 and passes, with a free-sliding fit, through the guide element 86 of the frame 70. The means for actuating the flexible link typically will be oriented at the end of the frame 70 opposite the guide element 86.

Preferably, the intermediate portion 132b is fixed to the carriage by means of the clamping bracket 116. An upper line orifice 134 and a lower line orifice 136 allow the flexible link 132 to pass through the upper shoulder 118 and lower shoulder 120, respectively, of the clamping bracket. A clamping screw 130, preferably arranged between the upper shoulder 118 and lower shoulder 120, and a retaining washer (unshown) fixedly engage the flexible link 132 against the clamping bracket 116. The clamping screw 130 can pass through the clamping bracket 116, and serve also to retain the clamping bracket 116 against the body 92 of the carriage 72. In the embodiment of the clamping bracket depicted in FIG. 4, the clamping screw 130 further serves to retain the connecting rod 52 within the connecting rod channel 138.

The animal watering system of the present invention enables upward and downward height adjustment of the drinkers 50 by providing means for imparting force on the carriages 72 in both an upwards and a downwards direction. Because the flexible link 132 is affixed to the carriage, such as by means of the clamping screw 130 of the clamping bracket 116, the application of tension to the first end 132a of the flexible link 132, as seen best in FIG. 3, will impart an upward force on the carriage 72, thereby causing carriage 72 to move upwardly relative to the frame 70 and the floor of cage 44, thus increasing the drinking height. The intermediate portion 132b of the flexible link 132 passes through the guide element 86 fixed to the frame 70, which functions as a pulley, transmitting a downward force on the carriage 72 when a tension force is applied to the second end 132c of the flexible link 132, thereby imparting a downward movement to the carriage 72 relative to the frame 70 and the floor of cage 44, thus decreasing the drinking height.

Figure 5:
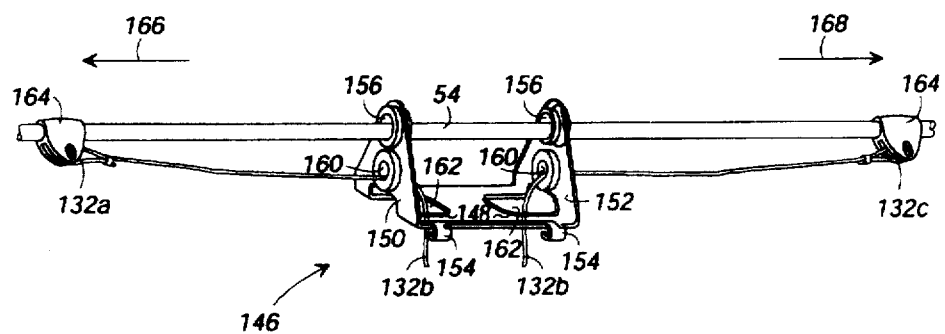
FIG. 5 is a perspective view of a bearing bracket element of the animal watering system of the present invention according to a preferred form.

In its preferred form, the present invention further comprises bearing brackets 146, as shown in FIGS. 2 and 5, affixed on the top of the row 42 of cages 44, generally above each vertical array of drinkers 50. The vertical arrays of drinkers 50 at the ends of the row 42 of cages 44 can be driven by a flexible link coupled to the actuating rod 54 and carried by bearing brackets 146 generally above a vertical array of drinkers in the interior of the row 42 of cages 44, preferably the interior array of drinkers adjacent the end of row 42. The bearing brackets 146 function to permit smooth transmission of the actuating forces used to raise and lower the carriages 72 of the drinkers 50.

As seen best in FIG. 5, bearing bracket 146 generally comprises a base 148 and first and second upright flanges 150, 152, respectively. Keepers 154 preferably are provided on the base 148 for affixing the bearing bracket 146 to the top of a cage 44. Actuating rod bearings 156 are provided through the first and second upright flanges 150, 152 to support the actuating rod 54. The actuating rod bearings 156 can be provided with plastic or TEFLON® bushings for smooth motion of the actuating rod 54. The intermediate portion 132b of the flexible link 132, adjacent first end 132a, passes through the first upright flange 152 and through a cutout 162 in the base 148. Similarly, the intermediate portion 132b of the flexible link 132 adjacent the second end 132c passes through the second upright flange 152 and a cutout 162 in the base 148. Plastic or TEFLON® line bearings or bushings 160 can be provided through first and second upright flanges 150, 152 to allow the flexible link 132 to slide more smoothly and freely therein.

The first end 132a of the flexible link 132 is attached to the actuating rod 54, at a distance from the bearing bracket 146 adjacent the first upright flange 150, by a turnbuckle 164 or other attachment means. The second end 132c of the flexible link 132 is attached to the actuating rod 54, at a distance from the bearing bracket 146 adjacent the second upright flange 152, in similar fashion. As the actuating rod 54 is moved in the direction of direction arrow 166, the first end 132a of the flexible link 132 is placed in tension, applying an upward force to the carriage 72 to move the carriage 72 upwardly. As the actuating rod 54 is moved in the direction of the direction arrow 168, the second end 132c of the flexible link 132 is placed in tension, thereby imparting a downward force on the carriage 72, causing carriage 72 to move downwardly.

As seen best in FIG. 2, the actuating rod 54 is driven by an actuating device, such as a winch 64, which can be remotely located at a conveniently accessible location and attached to the actuating rod 54 by means of a cable 60 and one or more pulleys 62. A yoke 58 can be utilized to allow a single actuating device such as winch 64 to drive two (2) or more actuating rods 54. Several alternate embodiments of the actuating system for driving the actuating rods 54 can be incorporated into the watering system 40 of the present invention. For example, in the embodiment depicted in FIG. 2, an electric winch 64 is provided at one end of the row 42 of cages 44 for imparting motion on the actuating rods 54 in the direction of direction arrow 166. A second electric winch (unshown) can be provided at the other end of the row 42 of cages 44 to move the actuating rods 54 in the direction of direction arrow 168. Alternately, a system of cables and pulleys can be provided to enable a single winch to drive the actuating rods 54 in both directions 166, 168. In a third embodiment, one or more linear actuators, such as pneumatic or hydraulic cylinders, can be utilized to drive the actuating rods 54 in either direction 166, 168.

In operation, the animal watering system 40 of the present invention enables a method of watering poultry pullets or other growing animals. The drinkers 50 are mounted to cages 44 by installing the clips 74 of the frames 70 onto the wires of the cage 44. If necessary, any wire sections which must be removed to accommodate the mounting of frame 70 on the cage 44 are first cut out. The actuating rod 54 is placed in position, and the carriage 72 of a first or driven drinker is positioned within the frame 70 by tightening the clamping screw 130 to securely engage the flexible link 132 onto the carriage 72. The driven carriage can then be moved upwardly and downwardly to adjust the drinking height as desired by driving the actuating rod 54 as described above. The carriages 72 of additional follower drinkers can be coupled to the carriage of the driven drinker by means of the connecting rod 52 as described above. Thus, the method of the present invention enables the drinkers 50 in the watering system 40 to be remotely lowered to the drinking height of starting pullets when a new flock of chicks is introduced to the cages 44. The method of the present invention further enables the remote lowering of drinkers in the event that the drinkers are inadvertently raised too far during adjustment as the pullets grow.

The follower carriages are adjusted, preferably by means of the locking collar 122 and set screw 124 arrangement described above, to adjust the drinking height of the follower carriages 72 within their respective cages 44 to match the desired drinking height of the driven carriage 72 within its cage 44. The height of one (1) or more drinkers 50 can be adjusted, independently of the remaining drinkers 50 in a vertical array, by means of the locking collar 122 and set screw 124 arrangement. Further, if circumstances dictate, one (1) or more follower drinkers can be taken off line of the system by loosening the locking collar 122 corresponding to the drinker 50 to be taken off line. In this manner, the connecting rod 52 will slide through the locking collar 122, and the corresponding carriage 72 will not be moved. This is convenient if one or more cages 44 will not be used and will save some wear and tear on the actuating system.

In this manner, as the drinking height of the driven drinker is adjusted upwardly or downwardly, all coupled follower drinkers 50 in a vertical array are simultaneously adjusted. Additionally, two (2) or more vertical arrays of drinkers 50, coupled by means of the actuating rods 54 can be driven by a single actuating device to enable the simultaneous coupled adjustment of the drinking height of all drinkers within a row of cages. Thus, the animal watering system of the present invention enables the watering elements to be driven upwardly and downwardly until the desired drinking height, from which the growing animals housed in each cage 44 can drink, is attained.

While the present invention has been disclosed in preferred form, it will be apparent to those skilled in the art that many other modifications, additions, and deletions can be made therein without departing from the spirit and scope of the invention and its equivalents as set forth in the following claims.

What is claimed is:

1. An animal watering system comprising:
   (a) a first carriage comprising at least one watering element for dispensing water;
   (b) mounting means for slideably connecting said first carriage to a structure; and
   (c) height adjustment means for moving said first carriage in an upwards direction and a downwards direction along said mounting means.

2. The watering system of claim 1, wherein said height adjustment means comprises means for applying an upwards force to said first carriage and means for applying a downwards force to said first carriage.

3. The watering system of claim 1, wherein said height adjustment means comprises a link having a first end, a second end, and an intermediate portion between said first and second ends, said intermediate portion being connected to said first carriage, and wherein said height adjustment means further comprises means for applying a force to said first end of said link to move said first carriage in the upwards direction, and means for applying a force to said second end of said link to move said first carriage in the downwards direction.

4. The watering system of claim 3, wherein said mounting means further comprises a frame having a top, a bottom, and first and second sides, said first and second sides each comprising a track portion, and wherein said carriage comprises slots for slideably receiving said track portions.

5. The watering system of claim 4, wherein said mounting means further comprises a guide mounted adjacent one end of said frame, said link is a flexible link slideably engaged within said guide.

6. The watering system of claim 5, wherein said means for applying a force to said first end of said link and said means for applying a force to said second end of said link comprise an actuating member coupled with an actuating device, said first and second ends of said link being connected to said actuating member at a distance from one another.

7. The watering system of claim 6, wherein said actuating member is mounted adjacent said frame opposite said guide.

8. The watering system of claim 3 further comprising a second carriage comprising at least one watering element, said second carriage being coupled to said first carriage by a connecting rod.

9. The watering system of claim 8 wherein said first and second carriages each comprise a clamping bracket, said clamping brackets each comprising first and second shoulder portions through which said connecting rod passes, and wherein locking collars are affixed to said connecting rod between said first and second shoulders of each clamping bracket, thereby coupling the motion of said first and second carriages.

10. The watering system of claim 1, wherein said first carriage is a driven carriage and is coupled by a connecting rod to a plurality of follower carriages to form an array of carriages.

11. The watering system of claim 10, wherein said plurality of follower carriages in said array of carriages are aligned generally vertically beneath said driven carriage and follow the motion of said driven carriage in the upwards direction and in the downwards direction.

12. The watering system of claim 11, wherein said follower carriages each comprise a slot portion, and wherein said watering system further comprises a plurality of frames mounted on vertically stacked cages, each of said frames comprising a track portion, said slot portion of each of said carriages slideably engaging said track portion of one of said frames.

13. The watering system of claim 10, wherein said array of carriages is generally below a bearing bracket, and wherein said height adjustment means comprises an actuating rod carried slideably by said bearing bracket, said height adjustment means further comprising a link having a first end, a second end and an intermediate portion, said first end being connected to said actuating rod adjacent a first side of said bearing bracket and said second end being connected to said actuating rod adjacent a second side of said bearing bracket, said intermediate portion of said link being connected to said driven carriage.

14. The watering system of claim 13, wherein said intermediate portion of said link passes slideably through a guide element on said mounting means for said driven carriage opposite said actuating rod, whereby motion of said actuating rod in the direction of the first side of said bearing bracket causes said carriage to move in the upwards direction and movement of said actuating rod in the direction of the second side of said bearing bracket causes said carriage to move in the downwards direction.

15. The watering system of claim 10, wherein said driven carriage and said plurality of follower carriages each comprise a clamping bracket for connection to said connecting rod.

16. The watering system of claim 15, wherein said clamping brackets each comprise first and second shoulder portions through which said connecting rod passes, and wherein locking collars are affixed to said connecting rod between said first and second shoulder portions of each of said clamping brackets.

17. The watering system of claim 15, wherein said clamping brackets each comprise a channel for receiving said actuating rod and a clamping screw for securing said actuating rod within said channel.

18. A method for watering growing animals within an enclosure comprising the steps of:
   (a) supplying water to the animals from a watering element, wherein said watering element is disposed on a first carriage slideably connected to a mounting means mounted on the enclosure; and (b) adjusting the height of the first carriage within the enclosure by applying an upward force to the first carriage by means of a remote actuating device to move the first carriage in an upward direction, and by applying a downward force to the first carriage by means of the remote actuating device to move the first carriage in a downward direction so as to place the carriage in a watering position appropriate to the age and size of the animal.

19. The method of claim 18, wherein the upward force is applied to the first carriage by applying tension to a first end of a link having an intermediate portion coupled to the first carriage, and wherein the downward force is applied to the first carriage by applying tension to a second end of the link.

20. The method of claim 19, wherein tension is applied to one end of the link by moving an actuating member connected to the actuating device, to which the first and second ends are attached at a distance from one another, in the direction of the one end of the link to which tension is to be applied.

21. The method of claim 20, wherein the intermediate portion of the link passes through a guide element adjacent a bottom portion of the mounting means.

22. The method of claim 21 further comprising coupling a second carriage having a watering element thereon to the first carriage by means of a connecting rod, whereby motion of the first carriage imparts motion on the second carriage.

23. The method of claim 18, wherein said first carriage is a driven carriage, and wherein said method further comprises coupling a plurality of follower carriages to said driven carriage by a connecting rod to form an array of carriages, said plurality of follower carriages being aligned generally vertically beneath said driven carriage and following the motion of said driven carriage in the upwards direction and in the downwards direction.

24. The method of claim 18, further comprising remotely lowering said watering element to a starting drinking height corresponding to the height of a starting poultry pullet, introducing at least one starting poultry pullet into the enclosure, adjusting the drinking height of said watering element by remotely moving the carriage in an upwards direction and a downwards direction to generally correspond to the height of the at least one poultry pullet as it grows, and removing the at least one poultry pullet from the enclosure when it reaches maturity.

25. An adjustment mechanism for adjusting the height of a watering element above a floor portion of an animal enclosure upwards and downwards between an uppermost position and a lowermost position, the adjustment mechanism comprising:

(a) a substantially rigid frame comprising a track portion; and (b) a carriage for supporting the watering element, said carriage engaging said track portion, and movable along said track portion between the uppermost position and the lowermost position.

26. The adjustment mechanism of claim 25, further comprising means for applying an upward force to said carriage and means for applying a downward force to said carriage.

27. The adjustment mechanism of claim 26, wherein said means for applying an upward force and said means for applying a downward force comprise a link having a first end, a second end, and an intermediate portion, said intermediate portion being connected to said carriage and passing slideably through a guide element mounted on said frame.

28. The adjustment mechanism of claim 27, further comprising a bracket mounted generally above said frame, said bracket carrying an elongate actuating member, said first end of said link connected to said actuating member on one side of said bracket and said second end of said link connected to said actuating member on the other side of said bracket.

29. The adjustment mechanism of claim 28, further comprising actuating means connected to said actuating member for moving said actuating member in the direction of said first end of said link to move said watering element upwards, and for moving said actuating member in the direction of said second end of said link to move said watering element downwards.

30. The adjustment mechanism of claim 25, wherein said carriage further comprises means for coupling said carriage to a second carriage, whereby said second carriage follows movement of said carriage upwards and downwards.

31. The adjustment mechanism of claim 25, wherein said lowermost position of said watering element corresponds to the drinking height of the smallest animal to be housed in the enclosure, and said uppermost position of said watering element corresponds to the drinking height of the largest animal to be housed in the enclosure.

32. The adjustment mechanism of claim 25, wherein said carriage further comprises means for engaging a connecting rod, wherein a plurality of follower carriages can be coupled to the connecting rod.

33. The adjustment mechanism of claim 27, wherein said link is flexible.

34. A frame for supporting a watering element on a structure, said frame comprising:

(a) first and second side portions, each side portion having upper and lower ends and interior and exterior edges, said interior edge of said first side portion facing said interior edge of said second side portion;

(b) a top portion extending between said upper ends of said first and second side portions;

(c) a bottom portion extending between said lower ends of said first and second side portions; and (d) connection means for attaching said frame to the structure.

35. The frame of claim 34, wherein said interior edges of said first and second side portions each comprise a track portion for slideably engaging a carriage for supporting the watering element.

36. The frame of claim 35, wherein the structure is a cage comprising wires, and wherein said connection means comprises clips for engaging the wires.

37. The frame of claim 36, wherein at least one of said clips is provided on the exterior edge of said first side portion and at least one of said clips is provided on the exterior edge of said second side portion.

38. The frame of claim 34, further comprising a guide element adjacent said bottom portion, said guide element comprising an opening through which a flexible link may freely slide.

39. A carriage for carrying a watering element along a path on an animal enclosure, said carriage comprising:

(a) a body portion having means thereon for following the path; and (b) an attachment means mounted on said body portion for engaging actuating means for imparting upwards and downwards motion on said carriage along the path.

40. The carriage of claim 39, further comprising an arm having a first end connecting to said body portion and a second end connected to the watering element.

41. The carriage of claim 40, wherein said arm extends generally upwards from said body portion a distance approximately equal to the drinking height of a starting poultry pullet.

42. The carriage of claim 39, wherein said body portion comprises first and second flanges defining a slot therebetween, said slot comprising said means for following the path.

43. The carriage of claim 42, wherein a first arm extends generally upwards from said first flange to support a first watering element, and a second arm extends generally upwards from said second flange to support a second watering element.

44. The carriage of claim 43, wherein the path extends from an uppermost position to a lowermost position, and wherein when said carriage is in the lowermost position said first and second watering elements are supported at a drinking height of approximately between two and six inches, and wherein when said carriage is in the uppermost position said first and second watering elements are supported at a drinking height of approximately between twelve and sixteen inches.

45. The carriage of claim 39, wherein said attachment means further comprises means for engaging a connecting rod whereon two or more carriages can be connected to form a coupled array.

46. The carriage of claim 45, wherein said attachment means comprises first and second shoulder portions through which the connecting rod passes, and wherein a locking collar is affixed to the connecting rod between said first and second shoulders to cause all carriages in the coupled array to move upwardly and downwardly together.

* * * * *